United States Patent
Fendya et al.

(10) Patent No.: US 7,691,266 B2
(45) Date of Patent: Apr. 6, 2010

(54) SEPARATION DEVICES AND PROCESSES

(75) Inventors: Thomas J. Fendya, Homer, NY (US); Mark F. Hurwitz, Ithaca, NY (US); John D. Miller, Sunnyside, NY (US); Stephen A. Geibel, Cortland, NY (US); Marc Samson, St-Placide, CA (US)

(73) Assignee: Pall Corporation, Port Washington, NY (US)

( * ) Notice: Subject to any disclaimer, the term of this patent is extended or adjusted under 35 U.S.C. 154(b) by 330 days.

(21) Appl. No.: 11/938,809

(22) Filed: Nov. 13, 2007

(65) Prior Publication Data
US 2008/0251444 A1    Oct. 16, 2008

Related U.S. Application Data

(63) Continuation of application No. 09/890,355, filed as application No. PCT/US00/02071 on Jan. 31, 2000, now Pat. No. 7,316,780.

(60) Provisional application No. 60/117,972, filed on Jan. 29, 1999.

(51) Int. Cl.
*B01D 63/10* (2006.01)
*B01D 61/00* (2006.01)

(52) U.S. Cl. .......................... 210/321.76; 210/321.72; 210/321.74

(58) Field of Classification Search .................. None
See application file for complete search history.

(56) References Cited

U.S. PATENT DOCUMENTS

| 1,872,430 | A | 8/1932 | Ericson |
| 4,435,289 | A | 3/1984 | Breslau |
| 4,792,401 | A | 12/1988 | Truex et al. |
| 5,248,418 | A | 9/1993 | Munch |
| 5,685,990 | A | 11/1997 | Saugmann et al. |
| 5,945,000 | A | 8/1999 | Skidmore et al. |
| 7,316,780 | B1 | 1/2008 | Fendya et al. |
| 7,357,866 | B2 | 4/2008 | Diemer et al. |
| 2002/0134724 | A1 | 9/2002 | Heine et al. |
| 2005/0029192 | A1 | 2/2005 | Arnold et al. |
| 2005/0056600 | A1 | 3/2005 | Ranney |

FOREIGN PATENT DOCUMENTS

| DE | 201 06 646 U1 | 9/2001 |
| EP | 2 008 705 A1 | 12/2008 |
| JP | 59-73008 | 4/1984 |
| JP | 60-41505 | 3/1985 |

(Continued)

OTHER PUBLICATIONS

Koch "Membrane Systems Launches World's Largest Reverse Osmosis Element", Koch Membrane Systems, Inc.

(Continued)

*Primary Examiner*—Krishnan S Menon
(74) *Attorney, Agent, or Firm*—Leydig, Voit & Mayer, Ltd.

(57) ABSTRACT

A separation device comprises a cylindrical separation pack including a spirally wound porous medium, a feed channel including a shear region, a plurality of permeate passages extending along the permeate side of the porous medium opposite the shear region and perpendicular to the feed channel, a feed inlet, a retentate outlet, and a plurality of permeate outlets.

9 Claims, 11 Drawing Sheets

FOREIGN PATENT DOCUMENTS

| | | |
|---|---|---|
| JP | 62-204802 | 9/1987 |
| JP | 63-97207 | 4/1988 |
| JP | 5-208120 | 8/1993 |
| JP | 9-141060 | 6/1997 |
| JP | 11-267470 A | 10/1999 |
| WO | WO 00/13767 A1 | 3/2000 |
| WO | WO 03/055580 A1 | 7/2003 |
| WO | WO 2005/094963 A1 | 10/2005 |
| WO | WO 2007/038542 A2 | 4/2007 |

OTHER PUBLICATIONS

International Preliminary Examination Report for International Application No. PCT/US00/02071 Jul. 1998.

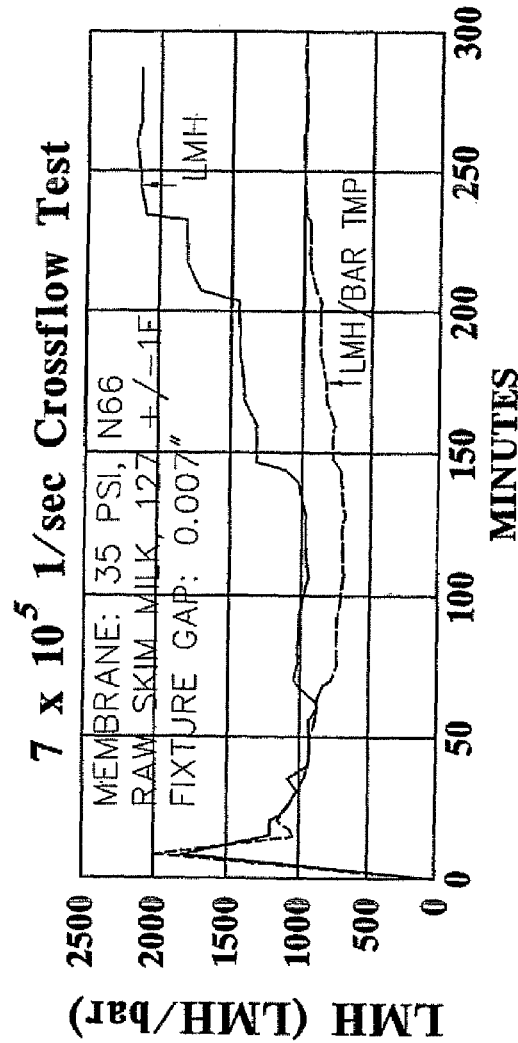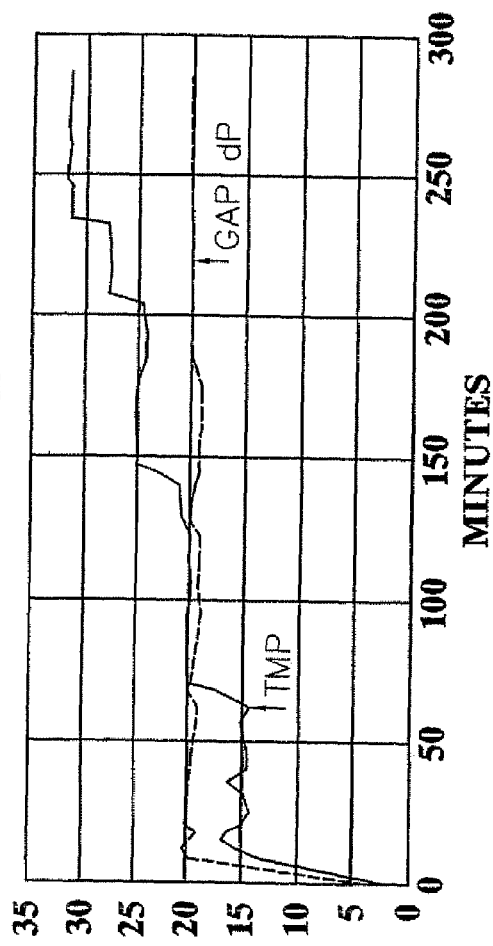
FIGURE 5
FIGURE 6

SECTION E-E

SECTION D-D

SECTION C-C

SEPARATION DEVICES AND PROCESSES

This application is a continuation of U.S. application Ser. No. 09/890,355, filed on Jun. 18, 2002, now U.S. Pat. No. 7,316,780 which is a United States national phase application of PCT/US00/02071, filed on Jan. 31, 2000, which claims priority to U.S. Application No. 60/117,972, filed on Jan. 29, 1999, all of which are incorporated by reference in their entirety.

FIELD OF THE INVENTION

This invention relates to the separation of particles and/or fluid from a mixture including the particles suspended in the fluid. For example, it relates to the purification or clarification of a fluid by removing particles from the fluid; to the segregation of particles by removing one or more types, sizes, or species of particles from the fluid; and to the concentration of one or more types, sizes, or species of particles by the removal of a portion of the fluid.

The invention is useful for a wide variety of particles and fluids in microfiltration, ultrafiltration, nanofiltration, reverse osmosis, and shear separation as described, for example, in International Publication No. WO98/09717. For example, the particles could be macro-molecules, micelles, liposomes, or bacteria suspended in a fluid, such as a biological fluid, as would be common in biotechnical, cosmetic, and pharmaceutical processes. As another example, the particles could be metal debris suspended in oil as would result from various metal machining operations. As further examples, the particles could be paper fibers suspended in water as would result from various portions of paper making processes or oil droplets suspended in water as occurs in cleanup of oily wastes.

BACKGROUND OF THE INVENTION

One type of conventional separation is "dead-end" filtration. In dead-end filtration, a fluid containing suspended particles is directed along a flow path where it is forced to flow through a porous filter medium, such as a porous membrane. The primary characteristic of the membrane is its pore size distribution. Those particles which are relatively small compared to the pore size distribution may be transmitted through the membrane with the fluid while those particles which are relatively large compared to the pore size distribution may be retained on the surface or within the pores of the membrane, thus effecting a separation of the particles suspended in the fluid. The size above which most particles are retained and below which most particles are transmitted is referred to as the cut-off size of the membrane.

As particles accumulate within or on the surface of the porous medium (i.e., a process known as fouling), the effective sizes of the membrane pores decreases. This results in an increase in the power required to maintain the flow through the membrane and a shift in the cut-off size. Both of these results of fouling have important consequences for separation processes. The increase in power required increases the cost of the separation process and the shift in cut-off size affects the function of the separation processes. In many separation applications, especially those involving biological fluids, the shift in cut-off size renders the use of conventional dead-end filters ineffective.

Another type of conventional separation is "tangential" or "cross-flow" separation. Cross-flow separation can alleviate, and in some cases eliminate, the detrimental effects of fouling in dead-end filtration. In cross-flow separation, the mixture of particles and fluid is driven through a passage or channel, the walls of which include a porous medium, such as a porous membrane. One portion of the mixture, (i.e., the retentate or concentrate) passes tangentially along the membrane and exits the device without passing through the membrane while the remaining portion of the mixture (i.e., the permeate or filtrate) passes through the membrane to effect the separation. The purpose of forcing a portion of the flow to be parallel or tangential to the membrane surface is to generate a layer of high shear near the membrane surface which tends by various mechanisms to reduce the fouling that would occur in dead end filtration.

Although effective, conventional cross-flow separation is not without serious problems. One problem is non-uniform distribution of the flow over the membrane surface, especially with cross-flow devices that are made up of flat sheets of membranes with wide rectangular channels for the feed flow. Another problem, which affects both tubular and rectangular channel forms of conventional cross-flow devices, is that the shear rates generated in conventional cross-flow devices are frequently not large enough to prevent the development of a layer of highly concentrated suspended particles on the feed (or upstream) side of the membrane. This layer of concentrated particles is referred to as a gel layer and the phenomenon by which it is created is referred to as concentration polarization. The gel layer acts as a filter with much smaller pores than the membrane. If particles of a certain size are retained by the membrane, much smaller particles will be retained by the gel layer. As a result, many conventional cross flow devices and processes are unable to effect separations of particles that differ in size by less than an order of magnitude.

The gel layer may be significantly reduced or eliminated by increasing the shear rate. Shear rates, which in conventional cross-flow devices may be on the order of $10^4$ inverse seconds, may be increased by increasing the pressure gradient between the feed inlet and the retentate outlet. However, it has generally been considered impractical to substantially increase the shear rate because a large pressure gradient from the feed inlet to the retentate outlet causes a large permeate flux at the inlet end of the device and a relatively small permeate flux at the retentate end. The large flux near the inlet counteracts the shear and leads to concentration polarization, while the small flux at the outlet reduces throughput and efficient use of the membrane. Restricting the permeate flow by means of a control valve downstream of the permeate outlet does not alleviate this problem. Restricting the permeate flow with a valve changes the pressure on the permeate side of the membrane uniformly but does not significantly change the large pressure gradient along the upstream side of the membrane. Consequently, the difference between the permeate flux near the inlet and the permeate flux near the outlet remains. It can even happen that the permeate flow is restricted so much that although the flux at the inlet end is reduced enough to avoid concentration polarization, the permeate flux at the outlet end is reversed and flows from the permeate side to the retentate side of the membrane. This phenomenon is known as Starling flow.

The gel layer may also be significantly reduced or eliminated by keeping the permeate flux below a critical value that depends on factors such as the shear rate, the membrane properties, and the suspension being separated. Control of permeate flux may be accomplished by control of transmembrane pressure (TMP), where TMP may be defined as the difference between the pressure at a location on the upstream side of the membrane and the pressure at the corresponding point on the downstream, or permeate, side of the membrane. The flux through the membrane tends to increase with TMP. However, the rate of fouling increases with flux; so the relationship between permeate flux and TMP is not generally linear. In conventional cross-flow devices, as the TMP is increased, the permeate flux increases, but the rate of increase approaches zero as the permeate flux asymptotically approaches a maximum, regardless of how much the TMP is increased.

A well known approach to controlling TMP is to re-circulate the permeate fluid through the permeate passages at a fast enough flow rate that the change in pressure within the permeate passages from the portion near the inlet end of the device to the portion near the retentate end of the device is the same as the corresponding pressure drop along the upstream side of the membrane. This approach, which is described in U.S. Pat. No. 4,105,547, requires the added expense of a pump to drive the re-circulating permeate flow. Another difficulty with re-circulating permeate to maintain uniform TMP is that generally the permeate volume flow rate is so much smaller than the retentate flow rate that the re-circulation rate must be very large, or the cross sectional area of the permeate passages must be excessively small, to establish a pressure drop equal to that on the retentate side.

SUMMARY OF THE INVENTION

The present invention provides many improved separation devices and processes. For example, according to one aspect of the invention, a separation device comprises a feed channel through which feed fluid flows. The feed channel includes a shear region having a length in the direction of feed fluid flow. The separation device also comprises no than one permeate channel operatively associated with the shear region of the feed channel. The permeate passage extends generally perpendicular to the direction of feed fluid flow. The permeate passage has a width in the direction of feed fluid flow which is less than the length of the shear region of the feed channel. The separation device further comprises a porous medium positioned between the shear region of the feed channel and the permeate passages.

According to another aspect of the invention, a separation device comprises a feed channel through which feed fluid flows. The feed channel includes a shear region. The separation device also includes no more than one permeate passage operatively associated with the shear region of the feed channel. The permeate passage extends generally perpendicular to the direction of feed fluid flow and has a width in the direction of feed fluid flow less than about 20 mm. The separation device further comprises a porous medium positioned between the shear region of the feed channel and the permeate passage.

According to another aspect of the invention, a separation device comprises a feed channel, two or more permeate passages, and a porous medium. The feed channel includes a shear region and the permeate passages are operatively associated with the shear region of the feed channel. Further, the permeate passages include at least first and second permeate passages which are isolated from one another. The porous medium is positioned between the shear region of the feed channel and the permeate passages.

According to another aspect of the invention, a separation device comprises a feed channel through which feed fluid flows and two or more permeate passages through which permeate flows. The feed channel includes a shear region and the permeate passages are operatively associated With the shear region of the feed channel. The separation device further comprises at least first and second flow/pressure control devices. Each of the first and second control devices are arranged to control permeate one permeate and/or pressure within one permeate passage or group of permeate passages independently of the permeate flow and/or pressure within another permeate passage or group of permeate passages. The separation device further includes a porous medium positioned between the shear region of the feed chamber and the permeate passages.

According to another aspect of the invention, a separation process comprises generating a shear layer in a feed fluid and passing permeate from the shear layer into a first permeate passage. The separation process further comprises passing permeate from the shear layer into a second permeate passage isolated from the first permeate passage.

According to another aspect of the invention, a separation process comprises generating a shear layer in a feed fluid and passing permeate from the shear layer into first and second permeate passages. The separation process further comprises controlling permeate flow and/or pressure in the first and second permeate passages independently of one another.

According to another aspect of the invention, a separation process comprises generating a shear layer in a shear region at a porous medium. The separation process further comprises independently controlling the transmembrane pressure (TMP) incrementally along the length of the shear region.

Separation devices and processes embodying one or more of the aspects of the present invention provide many advantages over conventional devices and processes. For example, many of the embodiments operate at much higher shear rates than some of the conventional devices and processes, e.g., shear rates higher by an order of magnitude or more. Consequently, these embodiments can operate for an extended period of time without significantly fouling the porous medium and without the formation of a gel layer adjacent to the porous medium. Further, many of the embodiments provide for control of the permeate flow and/or pressure, allowing highly efficient use of the entire porous medium and enhanced permeate throughput even at the higher shear rates.

DESCRIPTION OF THE FIGURES

FIG. 5 is a graph of flux vs. time.

FIG. 6 is a graph of pressure vs. time.

DESCRIPTION OF EMBODIMENTS OF THE INVENTION

In accordance with one aspect, the invention provides cross-flow devices and processes which generate a layer of high shear in a shear region between a feed inlet and a retentate outlet, thereby operating at shear rates large enough to prevent the formation of a gel layer, and which control permeate flow or pressure, and therefore TMP, in the shear region along the length of the porous medium without recirculating permeate. Feed fluid may be directed through the shear region in a single pass made or recirculated in a multipass mode. The porous medium may be any separation medium suitable for the type of fluid being processed and the desired type of separation, e.g., microfiltration, ultrafiltration, nanofiltration, reverse osmosis, or shear separation. The porous medium may comprise a porous metal, ceramic, glass, or polymeric medium. The porous medium may be in the form of a porous sheet or tube, a woven or non-woven fibrous web, a fibrous mass, or a porous or semipermeable membrane. Preferred porous media include polymeric membranes, a fine woven metal mesh, and a porous metal such as porous gold.

Various cross flow devices and processes embodying the invention are capable of generating large shear rates, e.g., in excess of 500,000 inverse seconds or even in excess of 700,000 inverse seconds, by driving large feed flows in the shear region through small openings such as narrow gaps having porous surfaces or small diameter tubes having porous walls. Driving large flow rates through narrow gaps generates a large pressure drop in the shear region between the feed inlet and the retentate outlet of the device, and the permeate flow or pressure, and therefore TMP, is preferably controlled in the presence of such large feed inlet to retentate outlet pressure differentials. In accordance with one aspect of the invention, the permeate path in the vicinity of the shear region is divided into at least one and preferably a plurality of independent permeate flow passages. The passages are preferably oriented generally perpendicular to the feed flow direction. The permeate flow passages (or groups of permeate flow passages) are preferably isolated from one another to allow an independent permeate flow or pressure within each permeate flow passage (or group), thereby incrementally controlling TMP along the entire length of the shear region. The permeate flow or pressure in the permeate passages is preferably controlled such that the TMP for each permeate passage (or group) corresponds to a desired relationship of the TMP along the length of the shear region. For example, it may be desirable to have the TMP constant along the length of the shear region, i.e., a uniform TMP, or it may be desirable to have the TMP at one or more locations along the shear region higher or lower than at other locations, i.e., a non-uniform TMP.

Figure 1:
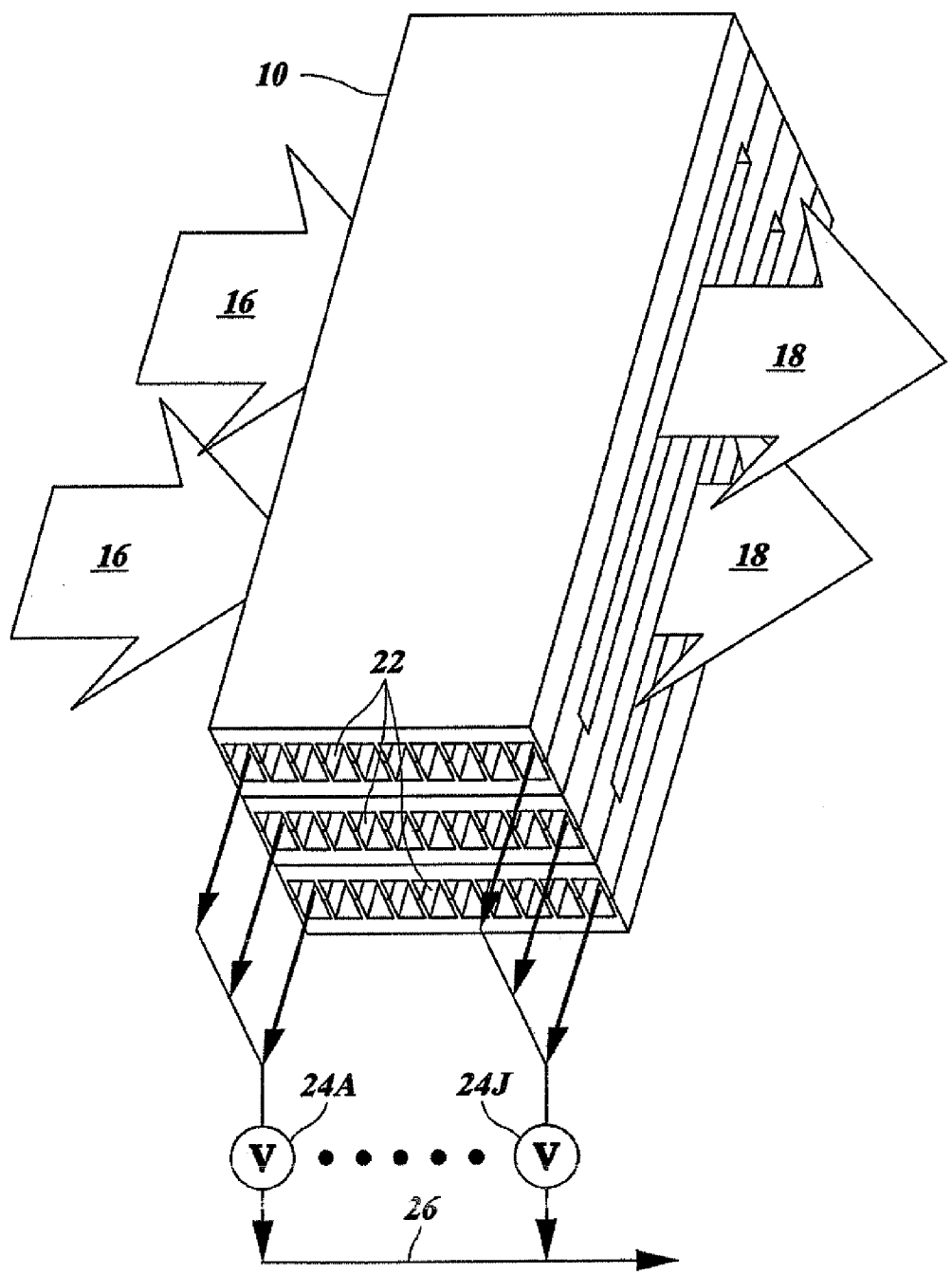
FIG. 1 is a schematic representation of a cross flow device.
Figure 2:
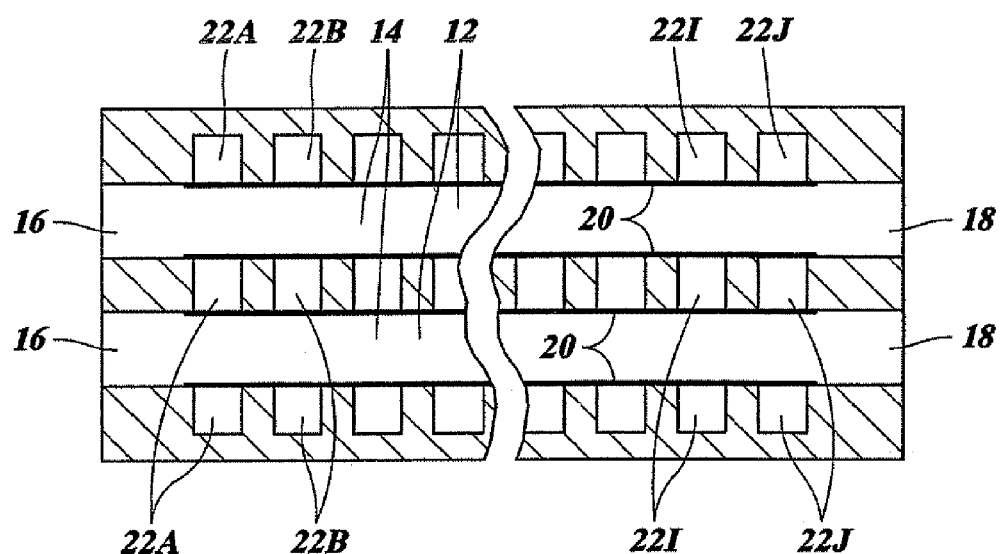
FIG. 2 is a cross section of the cross flow device of FIG. 1.

A sketch of the flow paths for one example of a cross flow device 10 embodying the invention is shown in FIGS. 1 and 2. In this device 10 two generally planar, narrow gap, feed (or retentate) channels 12 are shown. Alternatively, one or more than two feed channels can be used. For example, cross flow devices with more feed channels can be constructed by repeating the structure shown in the vertical direction. Each channel 12 includes a shear region 14 in the gap between a feed inlet 16 and a retentate outlet 18 where a layer of high shear is generated as the fluid flows from the feed inlet 16 to the retentate outlet 18, as shown in FIG. 2. Each narrow gap preferably has a height, more preferably a uniform height, in the range from about 0.07 mm to about 1.30 mm. Each feed channel 12 also preferably includes an upper porous medium 20 and a lower porous medium 20, such as a porous membrane, each of which defines a porous surface in the shear region 14 of the feed channel 12 and separates the shear region 14 of the feed channel 12 from the permeate passages 22, as shown in FIG. 2. Alternatively, only a single porous medium may be disposed in each feed channel. A feed manifold may be arranged to conduct fluid from a single feed pipe to the multiple feed channels. A retentate manifold may be arranged to conduct fluid away from the multiple retentate outlets to a single retentate pipe.

Fluid that passes from the feed channel 12 through the membranes 20 enters one of the many permeate passages 22, the permeate passages 22 being preferably oriented perpendicular to the direction of feed flow. Each permeate passage 22 is preferably dimensioned such that the span across (i.e., the width of) one permeate passage 22 in the feed flow direction encompasses a small segment of the length of the shear region 14 of the feed channel 12, for example, less than about 75%, preferably less than 50%, more preferably less than 25%, and even more preferably less than 15% or less than 10%. Consequently, there is only a relatively small pressure differential along the feed channel 12 from the upstream or leading edge to the downstream or trailing edge of each permeate passage 22. Although the widths of the permeate passages 22 may vary one from another, the widths are preferably uniform and are preferably in the range from about 2 mm or less to about 15 mm or more. The width of each permeate passage 22 may be dimensioned such that the difference in TMP from the leading edge to the trailing edge of the permeate passage 22 is preferably on the order of about 10 psi or less, more preferably on the order of about 1 psi.

Permeate flow or pressure my be controlled in a variety of ways. For example, permeate flow from the permeate passages may be directed to a set of flow and/or pressure control devices. The flow and/or pressure control devices may be configured in any suitable manner, including, for example, as flow restrictors or valves. Flow restrictors, such as fixed or variable orifices or capillaries, may be preferable where less precise control is suitable. Preferably, the flow/pressure control devices comprise a set of flow control valves 24, as shown in FIG. 1. Each permeate passage 22 may be connected to a different flow control valve 24. However, it is preferable to group permeate passages 22a, 22b . . . 22i, 22j which are adjacent to similar feed pressures with a common flow control valve 24a . . . 24j. In the illustrated embodiment, all permeate passages 22a, 22b . . . 22i, 22j taking permeate from the same distance downstream of the feed inlet 16 direct their flow to the same control valve 24a . . . 24j. The number of control valves 24 is then equal to the number of permeate passages 22 into which the permeate flow from a single porous membrane 20 is divided. (To simplify the drawing, only the initial and final flow control valves 24a, 24j are shown in FIG. 1.) Alternatively, a permeate passage and one or more downstream permeate passages, e.g., two adjacent permeate passages 22a, 22b, may be coupled to the same control valve. The output of each flow control valve 24a . . . 24j may be supplied to a common permeate manifold 26.

Each flow control valve 24 may be adjusted (either manually or by means of a control system which may be coupled to the flow/pressure control devices and which may or may not use feedback as part of the control mechanism) to maintain a desired permeate flow or pressure within a permeate passage 22 and, therefore, a desired TMP across the membrane 20 associated with that permeate passage 22. Different permeate flows or permeate pressures may be provided for different permeate passages 22. The control valves 10 are preferably adjusted to provide a permeate flow or pressure within each permeate passage 22 which generates a substantially uniform TMP along the entire length of the shear region 14. However, the control valves 10 may be adjusted to provide a non-uniform TMP along the length of the shear region 14. Further, whether the TMP is initially uniform or non-uniform, the control valves 10 may be adjusted over time to vary the permeate flow or pressure within the permeate passages 22, for example, to compensate for any changes in the permeability of the membrane.

One advantage a cross-flow device embodying this invention has over conventional cross-flow devices is that it allows much higher shear rates to be generated while maintaining reliable control of the permeate flow/pressure or TMP. This allows separations to be accomplished without the interference of a gel layer using the pore size distribution of the membrane to separate particles and/or the shear effect to separate particles independently of the membrane characteristics as described in International Publication No. WO98/09717. Because the shear rates are very large, the permeate flow rates at which these separations can be accomplished are orders of magnitude larger than can be achieved with conventional cross-flow.

Another advantage a cross-flow device embodying this invention has over conventional cross-flow devices is that it allows permeate flow to be controlled locally over the full length of the feed flow path. The spatial resolution of this local control corresponds to the widths of the permeate passages, which can be made as small as desired. The smaller the width of the permeate passages, the greater the spatial resolution but also the greater the number of flow control valves.

Figure 3:
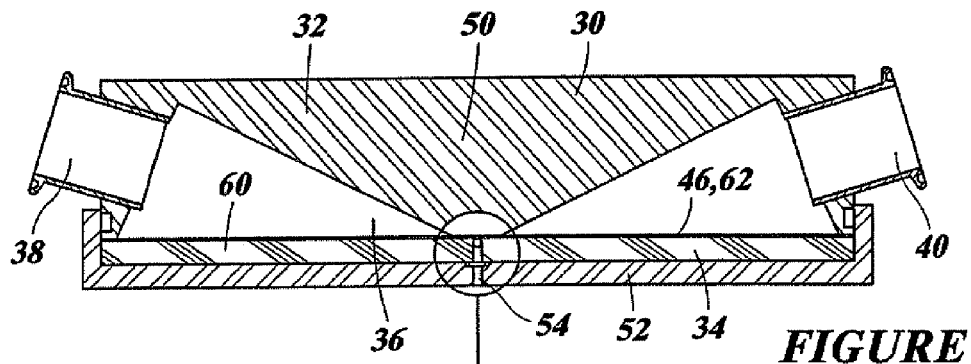
FIG. 3 is a cross section of another cross flow device.
Figure 4:
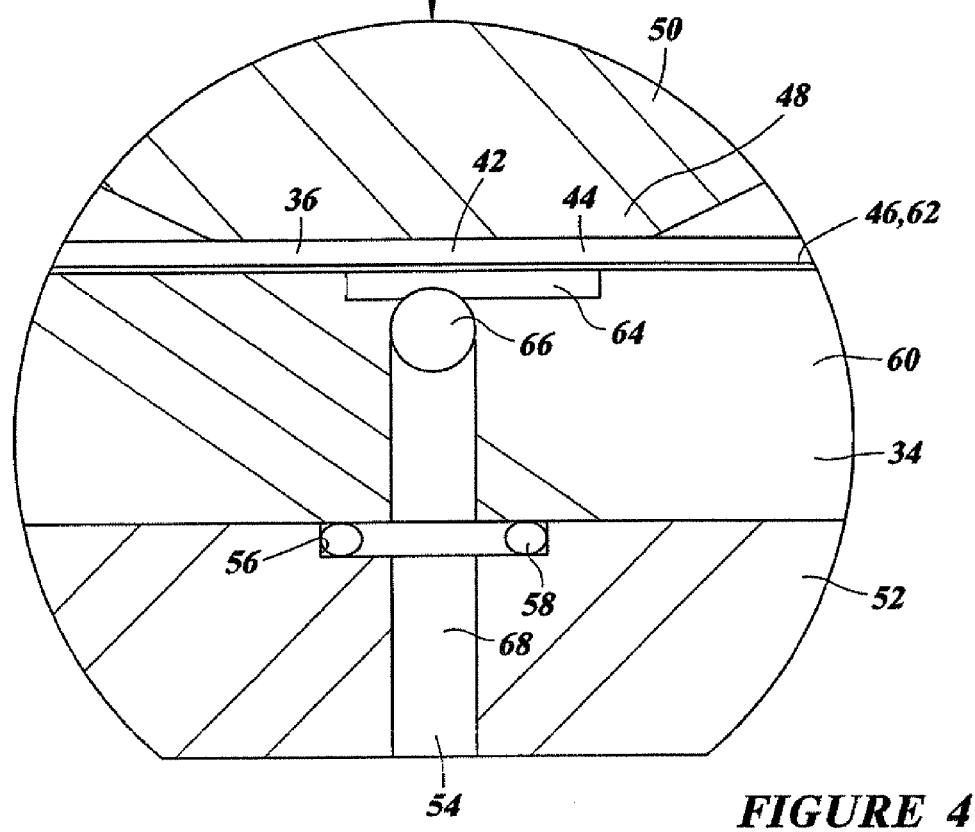
FIG. 4 is an enlarged view of a portion of the cross flow device of FIG. 3.

Another example of a cross flow device 30 embodying the invention is shown in FIGS. 3 and 4. The cross flow device 30 may be arranged as part of a test setup and may include a test fixture 32 and a filter element 34.

The test fixture 32 includes a feed channel 36 extending between a feed inlet 38 and a retentate outlet 40. The feed channel 36 includes a shear region 42 in a narrow gap 44. The gap 44 preferably has a uniform and stable height between the surface of a porous membrane 46 of the filter element 34 and the fixture wall 48 opposite the membrane 46 as well as a sealed gap cross section to assure that flow readings relate directly to the pressure drop across the gap 44. The width and length of the gap may be variously dimensioned without departing from the scope of the invention. The height is preferably in the range from about 0.07 mm to about 1.30 mm. In the illustrated embodiment, the gap 44 has a length of about 17.6 mm, a width of about 40 mm, and a height of about 0.178 mm.

The test fixture 32 may be configured in a variety of ways. For example, the test fixture 32 may include an upper housing portion 50 and a lower housing portion 52 formed from a structurally rigid material such as a rigid polymer or a metal, e.g., stainless steel. The upper housing portion 50 may include the feed inlet 38 and the retentate outlet 40. The lower housing portion 52 may include a permeate outlet 54 and a seat 56 for a permeate port O-ring 58. The lower housing portion 52 also lends additional structural integrity to the filter element 34 and aids in providing a uniform gap 44.

The filter element 34 preferable includes a support plate 60. A porous membrane support 62 is disposed on the support plate 60 and the porous membrane 46 is disposed on the membrane support 62. Both the porous membrane support 62 and the porous membrane 46 are preferably permanently affixed, e.g., solvent bonded, to the support plate 60 and preferably extend the full dimensions of the support plate 60 to assure no disruption of the flow in the gap 44. Each of the support place 60, the porous membrane support 62, and the porous membrane 46 may be fashioned from a variety of suitable materials. In the illustrated embodiment, the support plate 60 may comprise a rigid metal or polymeric material such as a polysulfone plate, the porous membrane support 62 may comprise a woven or nonwoven polymeric sheet or mesh, and the porous membrane 46 may comprise a polymeric membrane such as a nylon 66 membrane having a 35 psi $K_L$ and a 0.152 mm thickness as available from Pall Corporation. While a porous membrane is the preferred porous medium for this embodiment, other porous media, including woven or nonwoven polymeric sheets or porous metal sheets, are also suitable.

The cross flow device 30 of the illustrated embodiment has only one permeate passage 64 associated with the shear region 42.

The permeate passage 64 preferably extends generally perpendicular to the direction of feed flow and has a relatively narrow width from the leading edge to the trailing edge compared to the length of the gap 44. For example, the wide of the permeate passage 64 may be less than about 75%, more preferably less than about 60%, of the length of the gap 44. Limiting the relative extent of the permeate passage 64 facilitates control of the permeate flow and/or pressure within the permeate passage 64. Consequently, a permeate flow/pressure control device may be omitted. The gap 44 preferably extends upstream of the leading edge of the permeate passage 64 a distance sufficient to straighten the incoming feed flow. For example, in the illustrated embodiment, the leading edge of the permeate passage 64 is about 5 mm from the gap entrance and the trailing edge of the permeate passage 64 is about 2 mm from the gap exit.

The permeate passage 64 may be formed in any suitable manner, e.g., as a continuous rectangular channel as shown in FIGS. 1 and 2. In the embodiment illustrated in FIGS. 3 and 4, the permeate passage 64 comprises several slots formed in the support plate 60 and arranged in parallel next to one another. The number of slots and the dimensions of the slots may vary, but in the illustrated there are about thirty adjacent slots spaced about 0.64 mm apart, each slot being about 0.64 mm wide and 10.75 mm long. The slots define a total area of about 0.0004 square meter, which total area is the measure used for flux rate calculations. The slots are fluidly connected to form the permeate passage 64 by a duct 66 running under the surface of the support plate 60. A permeate manifold 68 runs from the permeate duct 66 through the permeate fitting in the lower housing portion 52 to the permeate outlet 54.

The test setup may further include pressure sensors immediately upstream and downstream of the cross flow device 30, attached, for example, by 1.5" tri-clamp fixture ports. Low pressure drop piping preferably extends between the feed pressure sensor and the fixture gap 44 and between the retentate pressure sensor and the fixture gap 44 to assure that any pressure drop is attributable substantially to the gap 44. Downstream of the pressure sensor a diaphragm valve may be fitted to adjust the flow rate and pressure drop across the gap 44. Feed may be supplied by means of a centrifugal pump through a heat exchanger to provide feed at a uniform temperature, and the temperature may be monitored immediately upstream of the feed pressure sensor. A diaphragm valve may be fitted to the permeate outlet 54 to control TMP and permeate flow/pressure, and a permeate pressure sensor is preferably fitted upstream of the permeate valve.

The cross flow device 30 shown in FIGS. 3 and 4 may be analyzed in any suitable manner. For example, two pressure drop values may be used to characterize the cross flow device 30. The first is the total feed pressure drop (PG) along the gap 44. For given gap height and length and fluid characteristics, PG dictates the wall shear rate, which is substantially constant along the length of the uniform gap 44. The second is the feed pressure drop (PM) along the portion of the gap length spanning the permeate passage 64. If P1 is the pressure at the leading edge of the permeate passage 64 and P2 is the pressure at the trailing edge of the permeate passage 64, such that PM=P1−P2, then for the calculation of TMP, the feed pressure PF at the permeate passage is defined as PF=P2+(0.5)(PM). TMP equals PF−PP, where PP is the permeate pressure.

The cross flow device 30 shown in FIGS. 3 and 4 as well as the test setup may be used for a wide variety of fluids. One example involves the filtration of raw skim milk. However, this example is not a limitation on the scope of the invention.

EXAMPLE

The cross flow device 30 shown in FIGS. 3 and 4 and the previously described test setup incorporating the cross flow device 30 were used to filter raw skim milk (0.08% milk fat) at 127° F. The target pressure drop PG along the gap 44 was 20 psi to produce a shear rate of $7 \times 10^5$ inverse seconds.

Prior to initiating the test run, conditions were set to prevent Starling flow reverse pressure rupture of the membrane and to prevent premature fouling of the membrane. The target feed milk flow rate was established in a bypass-to-drain upstream of the test fixture, at the target flow rate, pressure and temperature. The test fixture was prewarmed with water and the retentate valve was set to produce half the target pressure drop PG. Then the feed milk pressure was reduced to half PG; water flow to the test fixture was stopped; and milk flow was diverted into the test fixture. The permeate valve was opened very slightly to allow minor permeate flow, reducing the permeate pressure and reducing the Starling flow backpressure. After a moment, the retentate valve was opened to provide the target gap pressure drop PG, which resulted in a total feed flow rate of about 4 liters/minute. Permeate flow was monitored and the permeate valve was adjusted accordingly to maintain the target permeate rate. During the course of the experiment, the permeate rate was increased and maintained for extended periods. The experiment was terminated after nearly six hours with little discernible fouling of the membrane.

FIGS. 5 and 6 show the test results. The conclusion of the flux and fouling data is that either the filtration of the raw skim milk could have continued indefinitely at the 2130 LMH (liters/meters$^2$ hour) flux rate, or the flux rate could have been further increased.

The example also demonstrates that extremely high shear rates can be applied in a cross-flow device while controlling the TMP or permeate flow/pressure in the small permeate channel and that membrane fouling can be significantly reduced or prevented by the extremely high shear rates, which eliminate gel layer formation and allow the porous membrane characteristics to more fully participate in the separation process.

The example also demonstrates that practical, reliable control of TMP in a cross-flow device can be achieved even at extremely high feed flow rates, shear rates, and gap pressure drop by the use of a low-resistance permeate channels preferably oriented perpendicular to the feed flow direction and devices such as valves to control permeate flow and pressure.

Further, the example may be subject to several modifications. For example, a series of geometrically parallel permeate channels may be configured to extend more or all of the length of the gap. The width of the permeate channels may be increased or decreased, for example, to address Starling flow at startup particularly or to address membrane characteristics such as strength or fouling tendencies in the subject feed fluid. Multiple cross-flow gaps may be configured in parallel and their associated permeate channels having the same permeate pressure may be shared or manifolded to a common control valve. Additional cross-flow gaps and clusters of gaps and permeate passages as described previously may be configured in series to take advantage of feed flow capacity or by adding booster pumps between the individual clusters.

Although aspects the present invention have been described with respect to planar cross flow devices and processes, the invention is not limited to this feature. Modifications may be made and alternatives may be utilized by those skilled in the art, particularly in light of the foregoing teachings. For example, cylindrical or tubular cross flow devices and processes may also embody various aspects of the invention.

Figure 7:
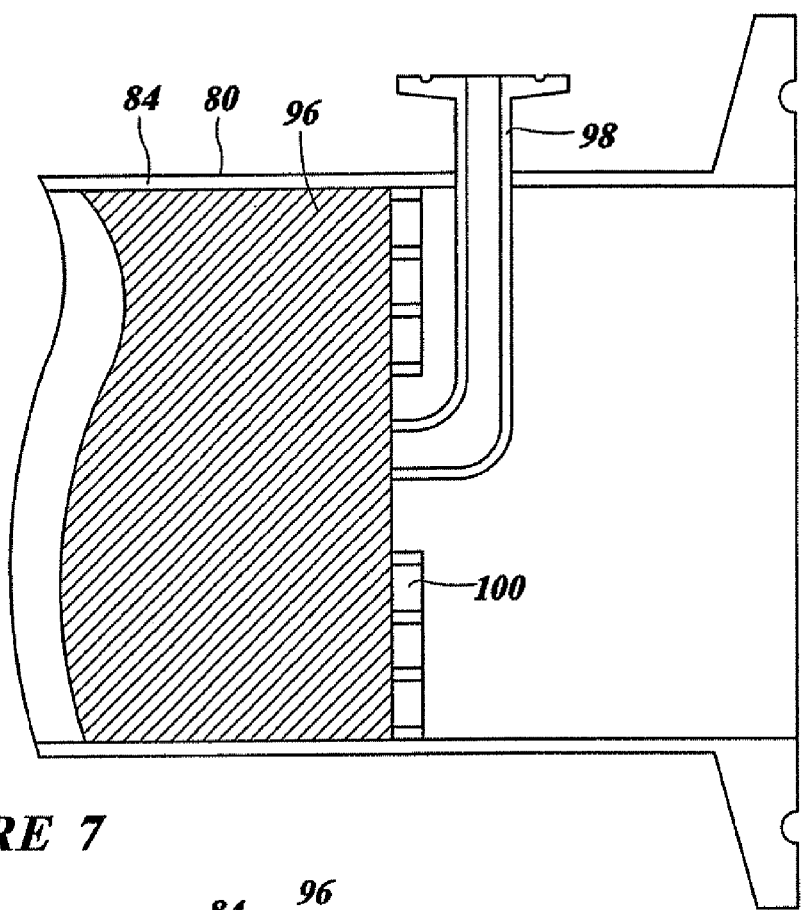
FIG. 7 is a partial cut-away view of another cross flow device.
Figure 8:
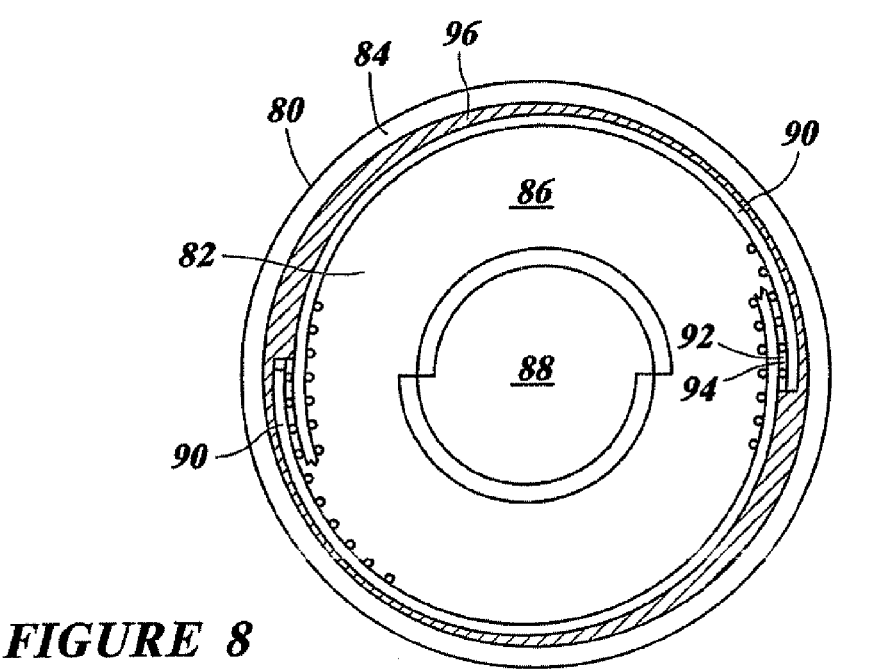
FIG. 8 is a cross section of the cross flow device of FIG. 7.

One example of a cylindrical cross flow device 80, which is illustrated in FIGS. 7 and 8, comprises a cylindrical cartridge 82 which includes an impermeable cylindrical shell 84 and a separation pack 86 positioned in the shell 84. The separation pack 85 may comprise a central spool 88 and one or more separation leaves 90 wrapped around the spool 88 to define narrow gaps 92 between adjacent leaves 90 which serve as shear regions 94 of the feed channels. A feed fluid stream is directed into a first end of the cartridge 82 where it flows into a first end of the separation pack 86 axially through the gaps 92 along the narrow feed channel shear regions 94 to the second end of the separation pack 86. The separation pack 86 is preferably sealed within the shell 84, for example, by a potting material 96 such as a polyurethane. The potting material 96 prevents feed fluid from bypassing the separation pack 86 along uncontrolled gaps, e.g., between the shell 84 and the separation pack 86. Other sealing mechanisms are disclosed, for example, in International Application No. PCT/US99/20509, which is incorporated by reference. Alternatively, the separation pack and the shell may be arranged to define a narrow outer gap between the outermost leaf (leaves) and the shell similar to the narrow gaps within the cartridge, thereby providing a shear region on a porous medium interfacing with this gap.

The separation pack 86 separates the feed fluid stream into a permeate stream and a retentate stream. The permeate stream and the retentate stream may exit the cylindrical cartridge 92 in any suitable manner which isolates the permeate stream from the retentate stream. In the illustrated embodiment, the permeate stream preferably exits the cylindrical cartridge 82 via a permeate outlet conduit 98 which extends from the second end of the separation pack 86 through the shell 84. The retentate stream preferably flows from the second end of the separation pack 86 through a thrust grate 100 and the exits through the open second end of the cylindrical cartridge 82. The thrust grate 100 preferably contacts the separation leaves 90 and reacts thrust from the retentate stream due to the feed fluid pressure drop through the feed channels from the first end to the second end of the separation pack 86. The thrust grate 100 may be configured in a wide variety of ways and is preferably attached to the shell 84 in order to transmit thrust forces to the shell 84 and help maintain, reduce forces on, and thereby the separation leaves 90 in place. However, the thrust grate 100 may be attached to the second end of the separation pack 86 in any other suitable location, for example, at the end of the spool 88.

Figure 9:
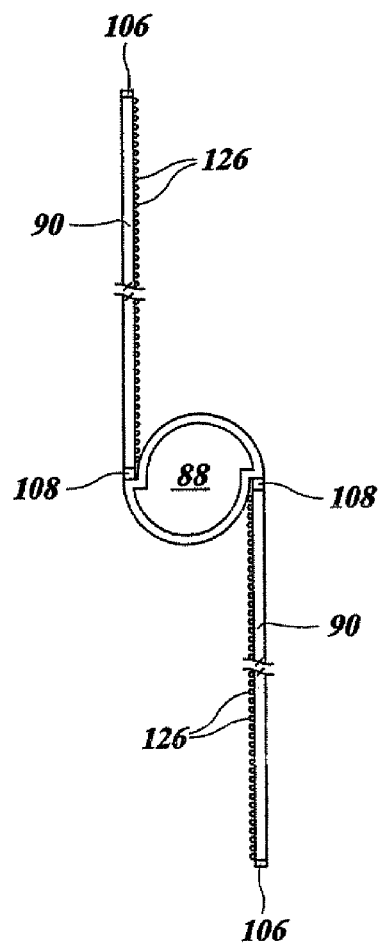
FIG. 9 is an end view of the separation pack of the cross flow device of FIG. 7 prior to wrapping the separation leaves around the spool.

The separation pack may be configured in a variety of ways. For example, in the illustrated embodiment, the separation pack 86 comprises a central permeate collection spool 88 and one or more separation leaves 90 coupled to and wrapped, preferably spirally, around the spool 88. As shown in FIG. 9, the spool 88 preferably has a volute configuration for centrally supporting the one or more spirally wrapped separation leaves 90. The spool 88 may also include one or more passages (not shown) for fluidly communicating permeate from the separation leaves 90 to the permeate outlet conduit 98.

Figure 10:
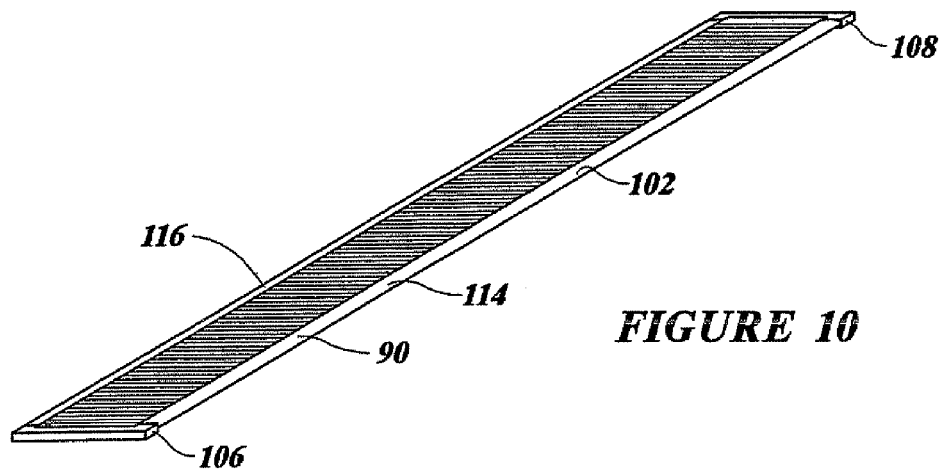
FIG. 10 is an oblique view of a separation leaf of the cross flow device of FIG. 7.
Figure 11:
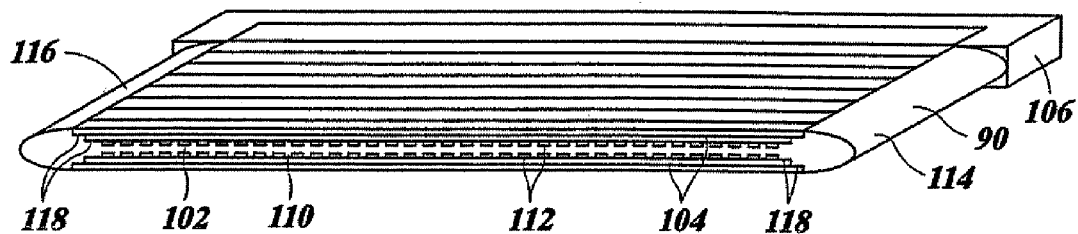
FIG. 11 is a sectional oblique view of an outer portion of the separation leaf of FIG. 10.
Figure 12:
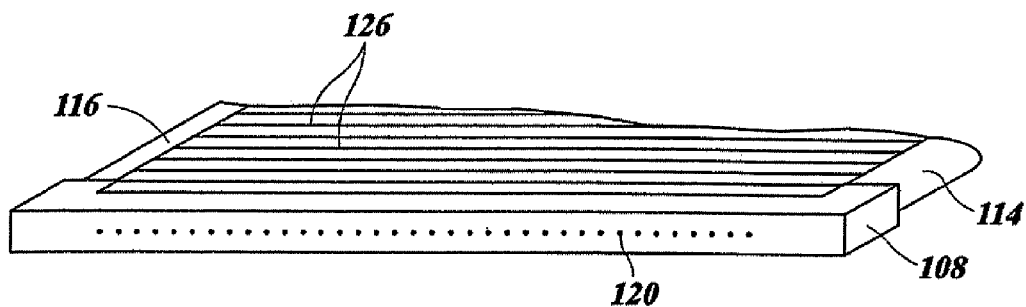
FIG. 12 is a sectional oblique view of an inner portion of the separation leaf of FIG. 10.

As shown in FIGS. 10-12, each separation leaf 90 may include a permeate grid 102, a porous medium 104, such as a porous membrane, preferably mounted to each of the opposing broad faces of the permeate grid 102, and a header 106, 108 mounted to each end of the permeate grid 102. The permeate grid 102 is preferably relatively thin and has sufficient flexibility to allow the leaf 90 to be wrapped around the spool 88 and the other leaves 90. The permeate grid 102 preferably comprises a polymeric material and may be formed as an extrusion, a rolled extrusion, a rolled film, a molded structure, such as an injection molded structure, or, less preferably, a machined grid.

The permeate grid 102 preferably includes a plurality of parallel ribs 110 which define a plurality of permeate passages 102, such as permeate grooves. The permeate ribs 110 and grooves 112 are preferably oriented substantially perpendicularly to the feed flow direction. Each permeate groove 112 is preferably large enough in cross section that the pressure drop from the outer end to the inner end along the groove due to permeate flow is relatively small compared to the pressure drop through the membrane 104 or the pressure drop from the feed end to the retentate end of the separation pack 86. The permeate grid 102 also preferably has leading and trailing edges 114, 116 which are profiled to provide a smooth transition for feed flow into the separation pack 86 and for retentate flow out of the separation pack 86. Further, the permeate grid 102 may have one or more steps 118 on both broad faces defining pockets within which the porous medium 104 may be attached. Steps 118 may be preferred where the porous medium 104 includes more than one layer.

The porous medium 104 may comprise one or more layers, preferably including at least one supported or unsupported porous membrane, and is attached to the permeate grid 102 in any suitable manner. A single membrane may be secured to each broad face of the permeate grid 102 by attaching and sealing the membrane to the ribs 110 and the step 118 in any suitable manner, including solvent or adhesive bonding or heat sealing. Attachment to the ribs 110 provides support for the membrane 104 against back pressure to prevent it from rupturing and to prevent it from billowing, which might decrease the height of the feed channel gap. Further, attaching the membrane 104 to the ribs 110 isolates the permeate grooves 112 from one another within the permeate grid 102. Securing the membrane 104 to the steps 118 within the pocket ensures the membrane 102 is substantially flush with the surface of the leading and trailing edges 114, 116, preventing flow discontinuities and damage to the membrane from fluid flow. Alternatively, the permeate grid may not be stepped and the porous membrane may extend outside the narrow gap of the feed channel and be bonded to the profiled surface of the leading and trailing edges.

Where the porous medium comprises two or more layers, additional layers may be attached to additional steps or may be extended beyond the inner layer and bonded to the profiles of the leading and trailing edges. Adjacent medium layers may also be joined to one another in any suitable manner which allows permeate to penetrate the medium layers. For example, adjacent medium layers may be conjoined continuously or recurrently, e.g., in strips parallel to the permeate grooves, in order to inhibit permeate recirculation in the feed direction between medium layers, which recirculation might otherwise act to billow the medium layers due to back pressure. Preferably, the outermost medium layer is attached in any suitable manner which results in a substantially flat medium surface interfacing with the feed channel gap.

A header 106, 108 may be attached to each end of the permeate grid 102, and, preferably, the porous medium 104 is also attached to the headers 106, 108. For example, the headers 106, 108 may be stepped in a manner similar to the permeable grid 102, and the one or more layers of the porous medium 104 may be secured in the pockets of the headers 106, 108 as previously described with respect to the permeate grid 102. Alternatively, the porous medium may be secured to the headers in any other suitable manner. For example, the porous medium may extend beyond the permeable grid onto an upper or lower surface of the header, where it may be attached. The headers 106, 108 may be formed from the same material as the permeate grid 102, e.g., a polymeric material. Where the porous medium 104 is attached by solvent bonding, both the permeate grid 102 and the headers 106, 108 may be formed from a polymeric material which is preferentially dissolvable in the solvent compared to the porous medium 104.

The header 106 which is spaced from the spool 88, i.e., the outer header, may be a blind header which terminates the permeate grooves 112, or groups of grooves, defined by the ribs 110 and porous medium 104. The blind header 106 is preferably joined to the permeate grid 102 and the porous medium 104 in a manner which isolates each permeate groove 112, or groups of permeate grooves, from one another. The header 108 which is nearest the spool 88, i.e., the inner header, is preferably coupled to the spool 88 to allow permeate to flow from the permeate grooves 112 in the permeate grid 102 to the permeate passages in the spool 88 and, hence, to the permeate outlet conduit 98. For example, the inner header 108 may include one or more passages which communicate between the permeate grooves 112, or groups of permeate grooves, in the grid 102 and the permeate passages in the spool 88.

The devices for controlling permeate flow/pressure in each permeate groove, or group of permeate grooves, may be operatively associated with the separation cartridge in a wide variety of ways. For example, the control devices may be external to the separation cartridge. The permeate grooves, or groups of grooves, in the permeate grid may then respectively communicate with corresponding isolated permeate passages in the inner header, which may, in turn, respectively communicate with corresponding isolated permeate passages in the spool. The spool passages, may, in turn, respectively communicate with separate permeate outlet conduits or isolated permeate passages in a single outlet permeate conduit. The individual permeate streams may then be connected to the flow/pressure control devices, e.g., valves, external to the separation cartridge and fed to a common manifold.

As another alternative, the control devices may be located in the spool. The individual permeate streams corresponding to the individual permeate grooves, or groups of grooves, may flow from the inner header to the respective flow/pressure control devices in the spool. From the control devices, the permeate streams may be fed to a common passage and hence to the single permeate outlet conduit. As yet another alternative, the flow/pressure control devices may be located in the permeate grid or between the permeate grid and the header. Permeate flowing from the control devices may then be fed to common passages in the header and in the spool and, hence, to the permeate outlet conduit.

Figure 13:
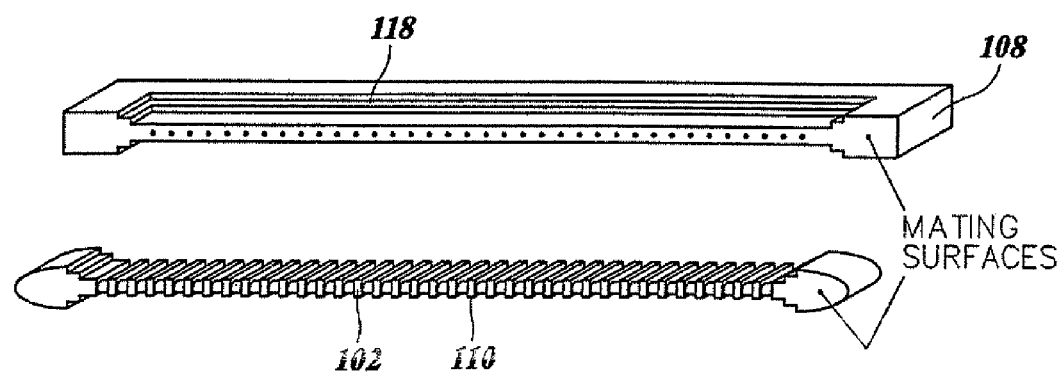
FIG. 13 is a sectional oblique view of the inner portion of the separation leaf of FIG. 12 showing the permeate grid and the inner header disassembled.

In the embodiment illustrated in FIGS. 12 and 13, the control devices 120 may be located in the inner header 108 and preferably comprise flow restrictors, such as orifices or capillaries. One flow restrictor 120 communicates with each permeate groove 112, or group of permeate grooves. Each restrictor 120 may be sized to provide a flow rate or pressure in the corresponding permeate groove(s) 112 that will, in turn, provide a desired TMP across the porous medium at the permeate groove(s). The permeate groove 112 or groups of permeate grooves, are preferably connected in parallel through the flow restrictors 120. From the flow restrictors 120 in the inner header 108, the permeate streams may be fed to a common passage in the spool 88 and, hence, to the permeate outlet conduit 98.

With the inner header 108 of each of the one or more separation leaves 90 coupled to the spool 88 to communicate permeate from the permeate grid 102 to the spool 88, the separation leaves 90 are wrapped around the spool 88. The leaves 90 are spaced from the spool 88 and from one another to form narrow feed gaps 92, as shown in FIG. 10, including the shear regions 94 of the feed chambers. The feed gaps preferably have a height, more preferably a uniform height, in the range from about 0.07 mm or less to about 1.30 mm or more, more preferably from about 0.12 mm to about 0.38 mm.

Figure 14C:
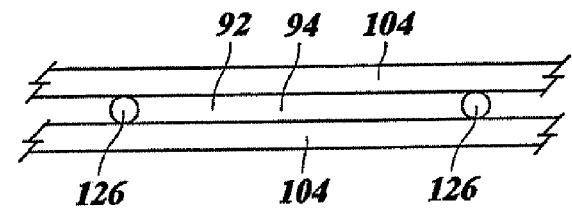
FIGS. 14A-14C are partial front views showing spacers between porous media.
Figure 14B:
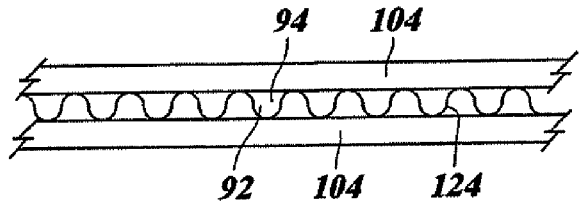
Figure 14A:
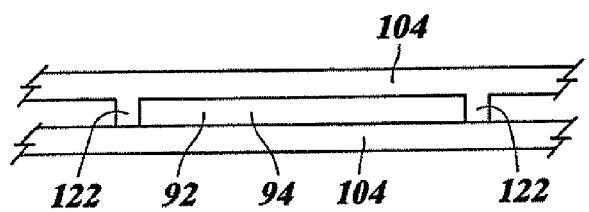
Figure 17A:
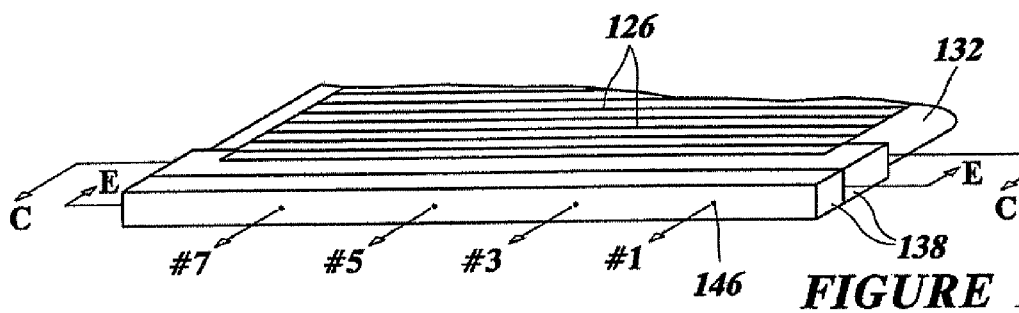
FIGS. 17A-17D are partial oblique views showing an end of a separation leaf of the cross flow devices of FIGS. 15 and 16 in assembled and disassembled states.
Figure 17D:
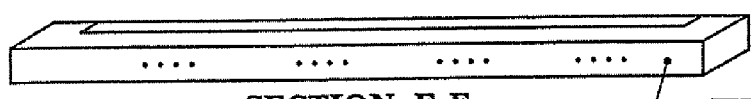
Figure 17C:
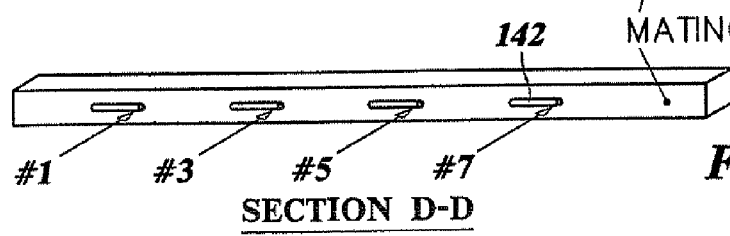
Figure 17B:

To maintain the gap height, spacers may be associated with each separation leaf. The spacers may be arranged in a variety of ways. For example, the spacers may comprise variously shaped standoffs 122 which face outwardly from the permeate grid and are integral to the porous medium 104, as shown in FIG. 14A, or to the permeate grid. Alternatively, the spacers may comprise a porous layer 124, such as a mesh or a corrugated film, which may be disposed within the feed gaps 92 between the porous media 104 with the corrugations extending axially, as shown in FIG. 14B. However, the gap height is preferably maintained by spaced rods 126 axially disposed in parallel in the gaps 92 between the leaves 90 and spool 88 and between adjacent leaves 90. The rods 126 may have a variety of cross sections, e.g., circular or rectangular. The rods preferably extend from the leading edge 114 to the trailing edge 116 of the permeate grids 102 between adjacent porous media 104, as shown in FIG. 14C. The rods 126 may be fabricated from a polymeric material or a polymeric coated metal or glass and may be positioned for attachment, for example, in a loom warp arrangement and trimmed after attachment. The rods 126 are preferably solvent bonded to the porous media 104, for example, before the separation leaves 90 are wrapped around the spool 88. Alternatively, the rods 126 may be solvent bonded to the separation leaves 90 after the leaves 90 are wrapped around the spool 88. In this manner the rods 126 may be attached to both adjacent porous media 104. As yet another alternative, the rods may be adhesively attached or welded to one or both membranes. The wrapped composite assembly has a high degree of structural integrity, but bonding the rods to the porous media 104 of adjacent leaves 90 even further strengthens the assembly and may allow the thrust grate 100 to be omitted.

Although the illustrated embodiments of the cylindrical cross flow device 80 include a spool 88 having one or more permeate passages 112 coupled to a permeate outlet conduit 98, other embodiments may be configured differently. For example, the spool may be free of any permeate passages, e.g., may be a solid structure, or it be eliminated entirely. The spirally wrapped separation leaf or leaves may include one or more blind inner headers and one or more outer headers which have one or more permeate passages fluidly communicating with the permeate grooves in the permeate grid of each separation leaf. Each outer header may be directly coupled to the cylindrical shell, and the permeate streams may be fed from the outer header through the shell to an external set of permeate flow/pressure control devices. Alternatively, the flow/pressure control devices may be located in the shell, between the shell and each outer header, in each outer header, or in the permeate grid.

Figure 15:
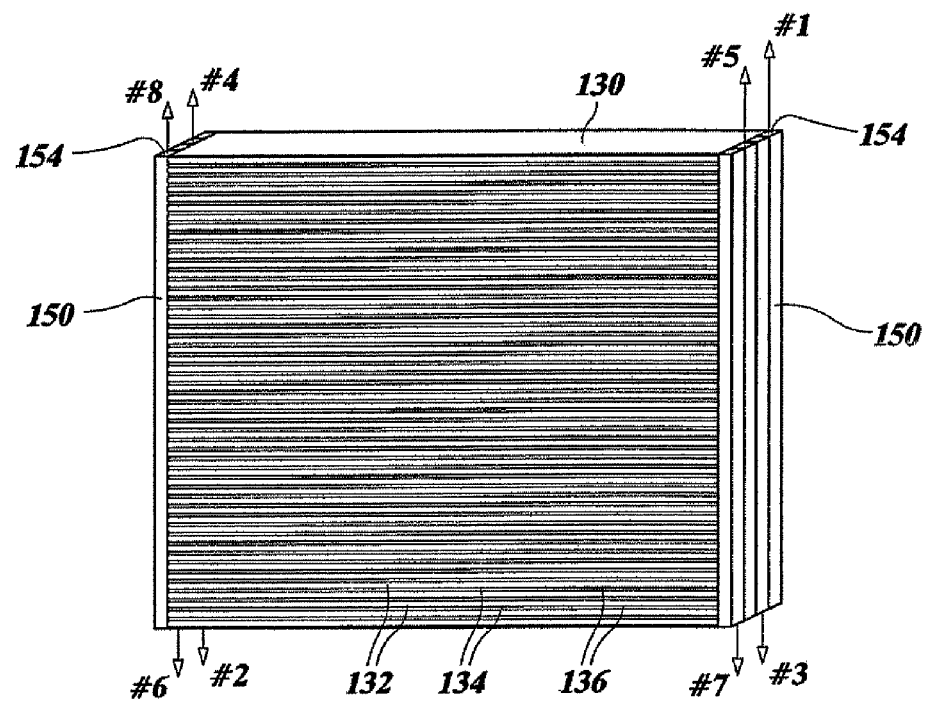
FIGS. 15 and 16 are oblique views of additional cross flow devices.
Figure 16:
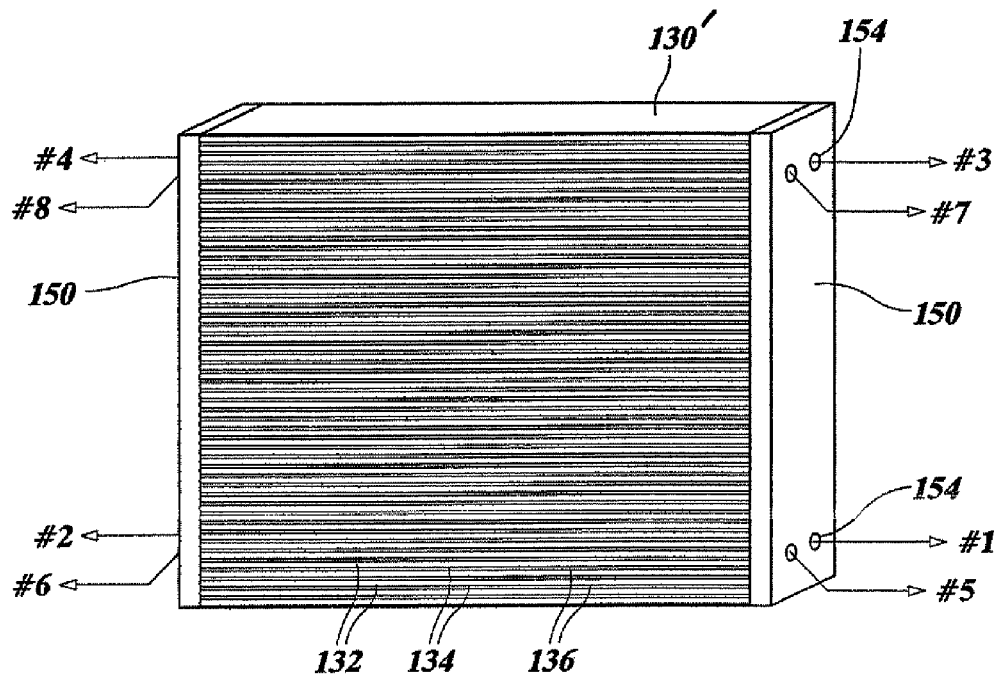

A cross flow device having composite configuration of separation leaves provides a high degree of structural integrity and may be utilized in a rectangular cross flow device, as well as a cylindrical cross flow device. For example, rectangular cross flow cartridges 130, 130', embodying the invention are shown in FIGS. 15 and 16. Each of the devices 130, 131' includes a stack of separation leaves 132, each similar to the separation leaf 90 shown in FIGS. 10-12. The leaves 132 are stacked such that the headers of adjacent leaves 132 lie atop one another with their leading and trailing edges aligned and a narrow rectangular gap 134 including the shear region 136 between adjacent leaves 132. Standoffs on the headers or shims between the headers may be provided to define the feed gaps 134. Where spacers, such as rods or porous medium standoffs, are provided in the feed gaps between the leaves 132, the header standoffs or shims may have substantially the same height as the spacers. Alternatively or additionally, the permeate grid may be formed to have sufficient structural rigidity to reduce the number of, or eliminate, the spacers, thereby decreasing the load on the membranes and the permeate grids. The stack of separation leaves 132 may be structurally joined in any suitable manner, including, for example, by an external housing or frame; by structural members such as tie rods, bolts, or running threads; by welding such as thermal or sonic welding; and/or by bonding such as adhesive or solvent bonding.

The permeate grids, porous media, and headers of a rectangular cross flow cartridge 130, 130' may be substantially similar to those described for a cylindrical cross flow cartridge 80. Preferably, however, the headers on both ends of the permeate grid of a rectangular cross flow cartridge 130, 130' have one or more passages for directing permeate away from the permeate grooves, or groups of grooves. The permeate flow/pressure control devices may be operatively associated with a rectangular cross flow cartridge 130, 130' in a wide variety of ways analogous to those previously described with respect to the cylindrical cross flow cartridges.

In the embodiments illustrated in FIGS. 15 and 16, each opposite header combines the permeate streams from a group of permeate grooves to form a permeate channel, where a permeate channel may be defined as one or, preferably, more permeate groove streams combined upstream from a permeate flow/pressure control device. Permeate channels are preferably isolated from and independent of one another. For example, as shown in FIGS. 17A-17D, each header 138 of the rectangular cross flow cartridge combines the permeate streams of four permeate grooves 140 in a single slot 142 to form a single channel 144, and each header 138 has four channels 144. Alternatively, more or fewer permeate grooves may be combined in a single channel, and more or fewer channels may be disposed in each header. Further, different channels may be formed from different numbers of permeate grooves, and different headers may have different numbers of channels. The channels 144, and corresponding permeate grooves 140, of any one header 138 are preferably isolated from and independent of one another. Further, the channels 144, and corresponding permeate grooves 140, of a header 138 at one end of a separation leaf 132 are preferably isolated from and independent of those of the header 138 at the opposite end of the separation leaf 132. Alternatively, corresponding channels on opposite headers may communicate with the same permeate grooves. While a header, such as the header 138 shown in FIGS. 17A-17D, is being described in the context of a rectangular cross flow cartridge, it may also be used in a cross flow cartridge having a different configuration, such as a cylindrical cross flow cartridge.

The permeate flow/pressure control devices 148 may comprise flow restrictors, such as orifices or capillaries, disposed in each header 138 between the channel slot 142 and the channel outlet, as shown in FIGS. 17A-17D. The channel outlets may be fed in parallel to a common permeate outlet conduit. However, in the embodiments illustrated in FIGS. 15 and 16, the channels 144 of the separation leaves 132 are grouped, for example, in eight groups corresponding to channel number one, channel number two, etc., according to the location of a channel 144 along the feed gap 134. Similarly situated channels 144 are fed to a common permeate duct 150 that may extend along the height of the stack of separation leaves 132. The permeate ducts 150 are preferably isolated from one another, e.g., the permeate duct 150 collecting permeate from all number one channels or number two channels, etc., are isolated from the other permeate ducts 150. Permeate may be taken from the permeate ducts 150 in a variety of ways, as shown in FIGS. 15 and 16. One advantage of separate permeate ducts 150 is that it allows an independent analysis of the permeate collected from similarly situated channels 144. Preferably, the permeate streams in the permeate ducts 150 are combined downstream in a single permeate outlet conduit.

Figure 18:
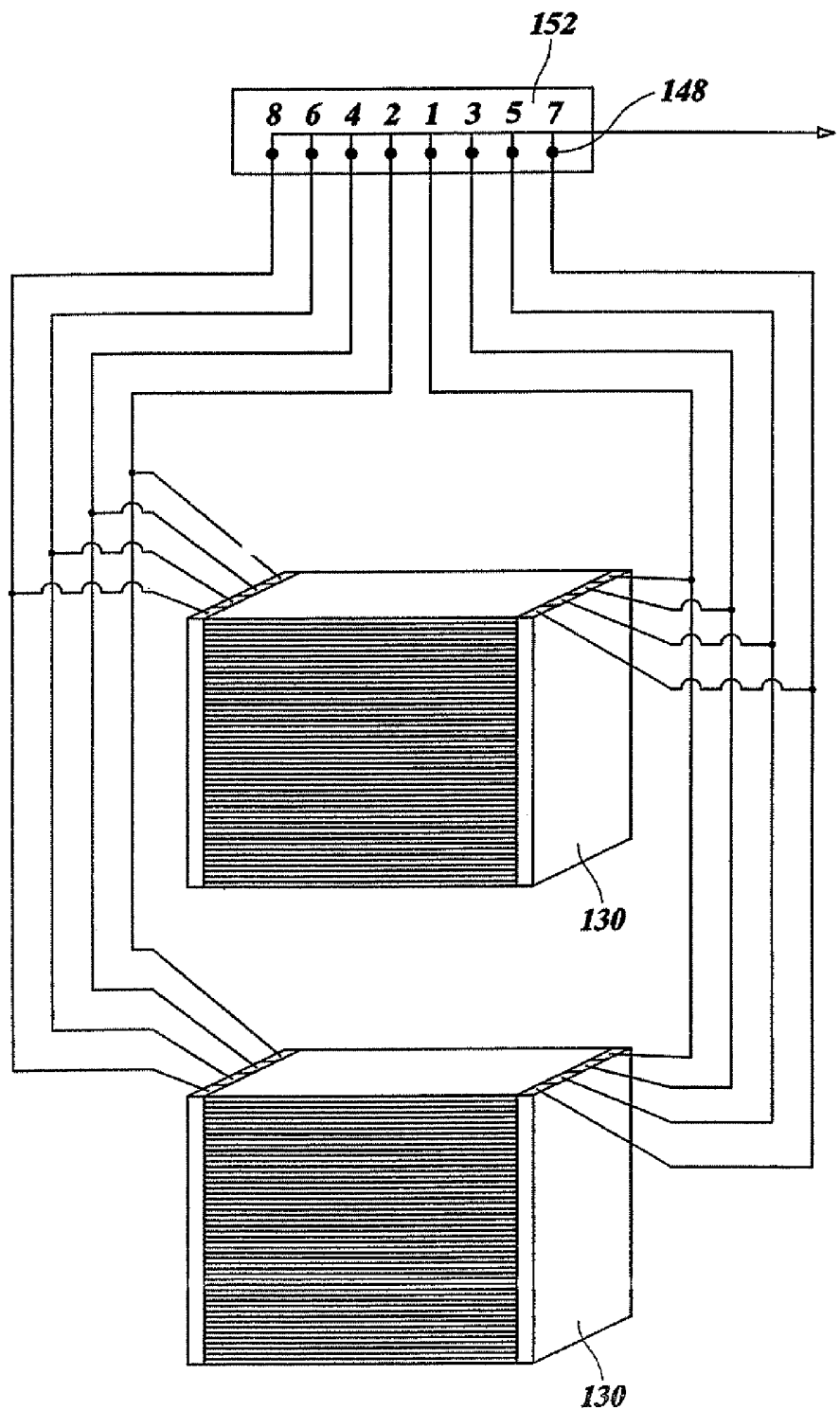
FIG. 18 is an oblique view of an assembly of cross flow devices.

The embodiment illustrated in FIG. 18 comprises a plurality of, e.g., two, rectangular cross flow cartridges 130 connected with their permeate ducts 150 in parallel. Alternatively, the cartridges may be connected with their permeate ducts in series or in various series/parallel arrangements. Feed fluid is preferably directed in parallel to the plurality of cartridges 130 from a common pressure source. Feed fluid may, alternatively, be directed in series through two or more cartridges. However, it is preferable to boost the pressure of the feed fluid as it exits a first cartridge and before it enters the second cartridge downstream in the feed stream in order to compensate for the feed-inlet-to-retentate-outlet pressure drop in the first cartridge. For example, a pump may be positioned in the feed stream between the first and second cartridges. While various series and/or parallel arrangements of cartridges are being discussed in the context of rectangular cross flow cartridges, these arrangements may be provided for cartridges having different configurations, including, for example, cylindrical configurations.

Each of the plurality of cartridges 130 are preferably substantially identical to the other cartridges. This allows the same permeate flows/pressures (and TMPs) to be produced for corresponding permeate channels in the various cartridges 130, resulting in a balanced, substantially equal flow from corresponding channels in the cartridges 130. Each rectangular cross flow cartridge 130 may be similar to the rectangular cross flow cartridge 130 shown in FIG. 15 except the permeate flow/pressure control devices are external to the cartridge, The headers in the rectangular cross flow cartridges 130 of FIG. 18 may be similar to those shown in FIGS. 17A-17D except the flow restrictors 146 are omitted and permeate passages 140 or groups of permeate passages, which do not function as flow restrictors, extend from the channel slot to the channel outlet and, hence, to the corresponding permeate duct 150. The permeate ducts 150 are preferably arranged such that the permeate duct 150 which collects permeate from the $n^{th}$ channel in the first rectangular cross flow cartridge 130 is connected in parallel with the permeate duct 150 which collects permeate from the $n^{th}$ channel in the second rectangular cross flow cartridge 130. The parallel arrangement of permeate ducts 150 is preferably fed to a set of permeate flow/pressure control devices 152, such as control valves, external to the rectangular cross flow cartridges 130. The permeate control valves 154 may, for example, be mounted on a control skid and the outlet of each control valve may be fed in parallel to a common permeate outlet 154. Alternatively, the permeate flow/pressure control devices may be mounted to one or both rectangular cross flow cartridges, in the permeate ducts, or in any of the other locations previously described.

Each of the rectangular cross flow cartridges may be contained in a frame or a housing (not shown) which transitions feed flow from circular cross section piping to the feed inlets of the rectangular cartridge and transitions retentate from the retentate outlets of the rectangular cartridge to circular cross section retentate piping. Baffles (not shown) may be provided in the housing to distribute fluid flow in the transition zones. The interface between the housing and the rectangular cross flow cartridge is preferably configured with seals (not shown) to prevent feed fluid from bypassing the shear regions of the feed gaps and to isolate feed fluid and retentate from permeate. A thrust grate (not shown) may be positioned against the separation leaves at the retentate outlet side of the rectangular cross flow cartridge and may be connected to the cartridge or, more preferably, to the housing.

Figure 19:
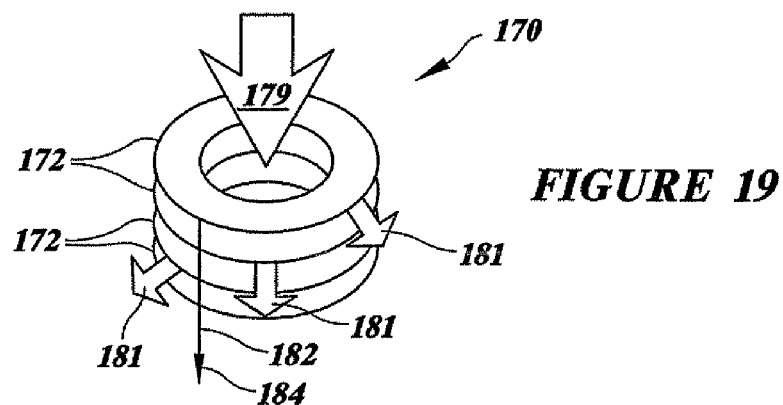
FIG. 19 is a schematic representation of another cross flow device.
Figure 20:
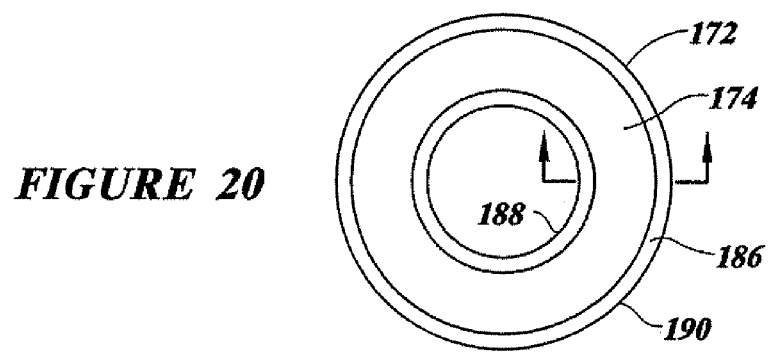
FIG. 20 is a top view of the stack of filter elements of the cross flow device of FIG. 19.
Figure 21:
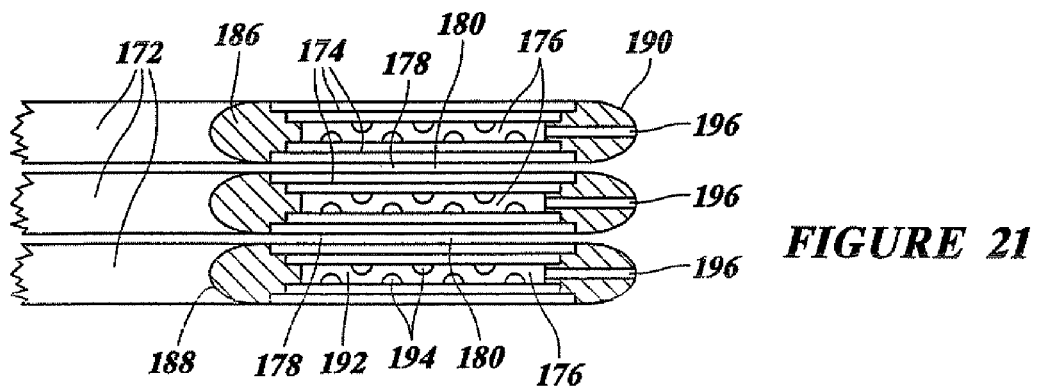
FIG. 21 is a partial cross section of the stack of filter elements of FIG. 20.

Another example of a cross flow device 170 is represented in FIGS. 19-21. In this device at least one and preferably two or more stacked filter elements 172 are arranged within a housing. Each filter element 172 has at least one porous medium 174, and preferably two opposite porous media 174, overlying a permeate passage 176. The filter elements 172 may be arranged in the housing in any suitable manner, for example, in a housing or as a self-contained stack arrangement with manifolds, to provide a feed channel which includes a narrow gap 178 having a shear region 180 operatively associated with the porous media 174. The gap 178 preferably has a height in the range from about 0.03 mm or less to about 1.30 mm or more. The gap may be void or it may comprise any suitable porous material or a channeled material, such as a mesh or corrugated material, through which the feed fluid may flow. The gap may be void or it may comprise a porous material through which the feed fluid may flow. In the illustrated embodiment, the feed channel extends between a central feed inlet 179 and peripheral retentate outlets 181, feed fluid being directed inside-out through the stack-of-filter elements 172. Inside-out flow is particularly preferred because the filter elements participate in dissipating the feed inlet-to-retentate outlet differential pressure. Alternatively feed fluid may be directed outside-in through the stack. In accordance with another aspect of the invention the filter element 172 includes only one permeate passage 176 operatively associated with the shear region 180 and the permeate passage 176 has a width in the direction of feed flow of less than about 40 mm. Limiting the width to less than about 40 mm facilitates control of the permeate flow and/or pressure within the permeate passage 176. Consequently, a permeate flow/pressure control device may be omitted. The permeate passage may be void or it may comprise a porous or channeled material. The permeate passage may be a void or it may comprise a porous material through which the permeate may flow. Permeate from the filter elements 172 may be supplied to a common permeate manifold 182 and directed to a permeate outlet 184. The permeate manifold may be located anywhere along the filter elements and may extend in any suitable direction to collect permeate from the permeate passages and direct it to the permeate outlet.

In the illustrated embodiment, each filter element 172 has a hollow, generally circular configuration. However, the filter elements may have any suitable configuration, including, for example, a hollow rectangular, e.g., square, or triangular or elliptical or any other closed configuration. Alternatively, the filter elements may have a non-polygonal configuration, such as the configuration of the previously described separation leaves. As yet another alternative, the feed fluid may be directed along a gap, preferably center fed, adjacent a single flat filter element. However, a hollow polygonal, including hollow circular, configuration is preferred because it allows the feed fluid to pass through the shear region in a plurality of dimensions, e.g., in both the x and y Cartesian dimensions. This better balances the forces acting on the cross flow device 170 and allows for a lighter, less structurally complex housing. Generally, any suitable multidimensional configuration with a repeated pattern may be utilized.

Further, the filter elements 172 may be fashioned in a variety of ways. For example, in the illustrated embodiment the porous medium 174 may be supported on a support plate 186. The support plate 186 may be fashioned in a manner similar to the previously described permeate grids, including a profiled leading edge 188, a profiled trailing edge 190, and a plurality of ribs 192 extending between the leading and trailing edges 188, 190. The ribs 192 preferably include openings 194 allowing the permeate to flow within the permeate passage 176 to a radially extending permeate duct 196 coupled to the permeate manifold 182. Each support plate may include two or more permeate ducts and the permeate manifold may include a corresponding number of axial conduits attached, preferably symmetrically, to the stack of filter elements. The manifold conduits may then provide structural support for the stack of filter elements as well as drain permeate to the permeate outlet.

The permeate passage 176 of the illustrated embodiment has a width of less than about 40 mm, preferably less than 20 mm, less than about 15 mm, less than about 10 mm, less than about 5 mm, or even about 1 mm or less. Limiting the width facilitates control of the permeate flow and/or pressure and obviates the need for a permeate control device such as valve, capillary or orifice. However, a permeate control device may be arranged with the cross flow device in any suitable manner, e.g., with the permeate ducts or the permeate conduits.

The porous media 174 overlying the permeate passage 176 may include any of the porous media previously described, including a porous membrane as well as a porous membrane support. While the illustrated embodiment includes both a porous membrane and a porous membrane support, some embodiments may omit the membrane support. Further, the porous media 174 may be bonded to the support plate 186 as previously described, including by solvent bonding.

Cross flow devices embodying this aspect of the invention provide very high shear rates, even with low feed inlet-to-retentate outlet differential pressures; simple, effective permeate control; and effective separation with little or no recirculation of the feed fluid. Yet, their structure need not be complex. Further, two or more cross flow devices may be connected in series, in parallel, or in a variety of series/parallel arrangements. Further, these arrangements may be modified during the course of operation, for example, at start-up to prevent Starling flow or after prolonged operation to counter pressure differential increases.

The various aspects of the invention has been described with respect to many embodiments. However, the invention is not limited to these embodiments. For example, one or more of the features of any of these embodiments may be combined with one or more of the features of the other embodiments without departing from the scope of the invention. Further, one or more of the features of any of these embodiments may be modified or omitted without departing from the scope of the invention. Accordingly, the various aspects of the invention include all modifications encompassed within the spirit and scope of the invention as defined by the following claims.

The invention claimed is:

1. A separation device comprising:
   a cylindrical separation pack including an axis and a porous medium spirally wound around the axis, wherein the porous medium has a feed side and a permeate side;
   a feed channel extending axially within the separation pack and including a shear region which extends axially along the feed side of the spirally wound porous medium;
   a plurality of permeate passages operatively associated with the shear region of the feed channel, the plurality of permeate passages extending along the permeate side of the porous medium opposite the shear region, wherein the porous medium is positioned between the shear region of the feed channel and the permeate passages and wherein the permeate passages are axially spaced and isolated from one another within the windings of the separation pack;
   a feed inlet fluidly communicating with the feed channel at one end;
   a retentate outlet fluidly communicating with the feed channel at another end; and
   a plurality of permeate outlets, each permeate outlet fluidly communicating with a permeate passage.

2. The separation device of claim 1 wherein the spirally wound porous medium comprises a spirally wound porous membrane.

3. The separation device of claim 1 further comprising a central support around which the porous medium is spirally wound.

4. The separation device of claim 3 wherein the plurality of permeate passages fluidly communicate with the central support via the plurality of permeate outlets.

5. The separation device of claim 1 further comprising a shell surrounding the separation pack.

6. The separation device of claim 5 wherein the plurality of permeate passages fluidly communicate through the shell.

7. The separation device of claim 1 wherein the separation pack further comprises a spacer layer in the feed channel.

8. The separation device of claim 1 wherein each permeate outlet comprises a restricted opening arranged to control permeate flow or pressure within the corresponding permeate passage.

9. The separation device of claim 1 further comprising a plurality of flow/pressure control devices, a flow pressure control device being fluidly coupled to a permeate passage to control flow or pressure within the permeate passage.

\* \* \* \* \*